(12) United States Patent  
Horner et al.

(10) Patent No.: US 8,382,035 B2
(45) Date of Patent: Feb. 26, 2013

(54) POPPET VALVE FOR CABIN PRESSURE CONTROL SYSTEMS

(75) Inventors: Darrell Horner, Oro Valley, AZ (US); Timothy R. Arthurs, Tucson, AZ (US); Bret Armstrong, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 632 days.

(21) Appl. No.: 12/556,345

(22) Filed: Sep. 9, 2009

(65) Prior Publication Data

US 2011/0057141 A1 Mar. 10, 2011

(51) Int. Cl.
*B64D 11/00* (2006.01)
(52) U.S. Cl. .................... 244/118.5; 454/71
(58) Field of Classification Search ............... 244/118.5; 454/71, 70–76
See application file for complete search history.

(56) References Cited

U.S. PATENT DOCUMENTS

| 3,263,702 | A | * | 8/1966 | Pullen et al. ............ 137/625.64 |
| 3,974,752 | A | * | 8/1976 | Burgess et al. ................ 454/73 |
| 4,309,022 | A | | 1/1982 | Reinicke et al. |
| 4,775,117 | A | * | 10/1988 | Standke ..................... 244/134 F |
| 5,575,311 | A | | 11/1996 | Kingsford |
| 6,637,456 | B2 | | 10/2003 | Sett |
| 6,874,998 | B2 | * | 4/2005 | Roby ........................... 417/407 |
| 7,066,808 | B2 | * | 6/2006 | Whitney et al. ................ 454/70 |
| 7,299,646 | B2 | | 11/2007 | Ezaki et al. |
| 7,802,588 | B2 | * | 9/2010 | Doutt ........................... 137/607 |
| 2007/0251588 | A1 | * | 11/2007 | Linder et al. ............... 137/625.5 |
| 2008/0233854 | A1 | | 9/2008 | Horner et al. |

* cited by examiner

*Primary Examiner* — Christopher P Ellis
(74) *Attorney, Agent, or Firm* — Ingrassia Fisher & Lorenz, P.C.

(57) ABSTRACT

A valve for use in a cabin pressure control system includes a valve body and a poppet. The valve body includes an inlet, an outlet, and a fluid flow passage therebetween. The poppet is disposed in the valve body. The poppet is moveable between at least a closed position, in which the poppet at least substantially restricts fluid from flowing through the fluid flow passage, and an open position, in which fluid is allowed to flow through the fluid flow passage. The valve body, the poppet, or both, have a fluorocarbon coating.

20 Claims, 4 Drawing Sheets

POPPET VALVE FOR CABIN PRESSURE CONTROL SYSTEMS

TECHNICAL FIELD

The present invention generally relates to a poppet valve, and more particularly relates to a poppet valve for cabin pressure control systems.

BACKGROUND

Poppet-type valves are used to control the flow of gases or other fluids in various types of apparatus and vehicles, such as aircraft, rockets, and missiles. In certain environments, poppet valves are used in aircraft pressure control systems for maintaining controlled cabin pressures when flying at high altitudes. However, in certain situations, when the poppet valves are normally closed during aircraft operation, ice may form on the poppet valves and/or the poppet valves may experience sticking.

Accordingly, there is a need for an improved poppet valve for use in cabin pressure control systems, for example that experiences reduced ice formation and/or sticking. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment of the present invention, a valve is provided for use in a cabin pressure control system of an aircraft. The valve comprises a valve body and a poppet. The valve body includes an inlet, an outlet, and a fluid flow passage therebetween. The poppet is disposed in the valve body. The poppet is moveable between at least a closed position, in which the poppet at least substantially restricts fluid from flowing through the fluid flow passage, and an open position, in which fluid is allowed to flow through the fluid flow passage. The valve body, the poppet, or both, have a fluorocarbon coating.

In accordance with another exemplary embodiment of the present invention, a valve for use in a cabin pressure control system for an aircraft is provided. The valve comprises a valve body and a poppet. The valve body includes a base assembly, an inlet, an outlet, and a fluid flow passage between the inlet and the outlet. The poppet is mounted on the base assembly. The poppet is moveable between at least a closed position, in which the poppet at least substantially restricts fluid from flowing through the fluid flow passage, and an open position, in which fluid is allowed to flow through the fluid flow passage. The poppet has a knife edge. The poppet, the base assembly, or both, have a fluorocarbon coating proximate the knife edge.

In accordance with a further exemplary embodiment of the present invention, a system for controlling cabin pressure in an aircraft is provided. The system comprises a first outflow valve, a second outflow valve, and a poppet-type pressure relief valve. The first outflow valve is configured to exhaust airflow from the cabin when the first outflow valve is open. The second outflow valve is configured to exhaust airflow from the cabin when the second outflow valve is open. The poppet-type pressure relief valve is configured to exhaust airflow from the cabin when the first outflow valve and the second outflow valve are closed, to thereby limit a cabin-to-ambient differential pressure and control the cabin pressure.

The poppet-type pressure relief valve comprises a valve body and a poppet. The valve body includes a base assembly, an inlet, an outlet, and a fluid flow passage between the inlet and the outlet. The poppet is mounted on the base assembly. The poppet is moveable between at least a closed position, in which the poppet at least substantially restricts fluid from flowing through the fluid flow passage, and an open position, in which fluid is allowed to flow through the fluid flow passage. The poppet has a knife edge. The poppet, the base assembly, or both, have a fluorocarbon coating proximate the knife edge.

BRIEF DESCRIPTION OF THE DRAWINGS

The present invention will hereinafter be described in conjunction with the following drawing figures, wherein like numerals denote like elements.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
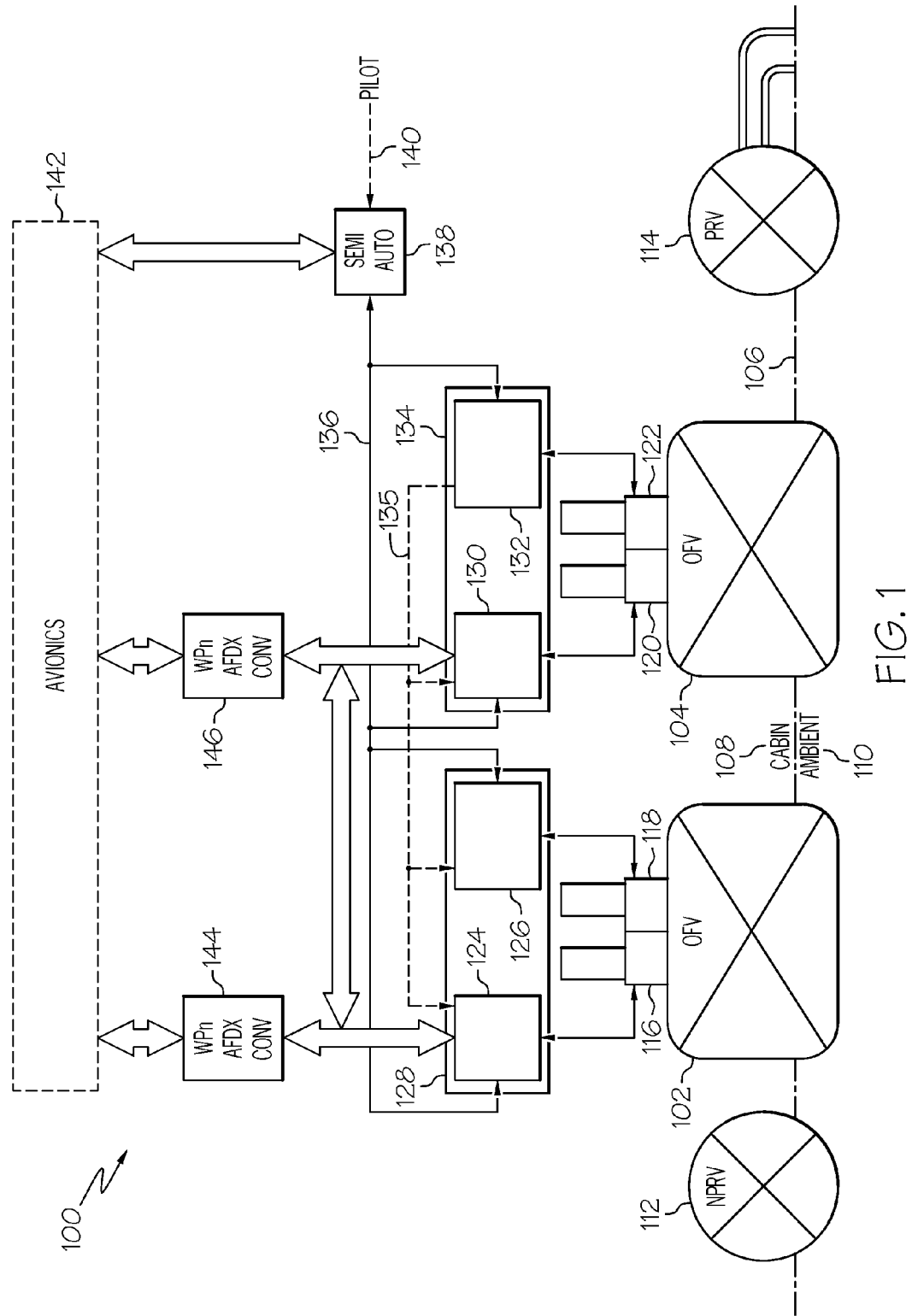
FIG. 1 is a functional block diagram of a cabin pressure control system of an aircraft, in accordance with an exemplary embodiment of the present invention.

FIG. 1 is a functional block diagram of a cabin pressure control system 100 of an aircraft, in accordance with an exemplary embodiment of the present invention. The cabin pressure control system 100 provides automatic cabin pressure control for the aircraft. In the depicted embodiment, the cabin pressure control system 100 includes first and second outflow valves 102, 104, a negative pressure relief valve 112, and a poppet-type pressure relief valve (PRV) 114.

In a preferred embodiment, the first and second outflow valves 102, 104 are installed in an aircraft fuselage having a fuselage wall 106, which defines a border between the aircraft cabin air 108 and external ambient air 110. The first and second outflow valves 102, 104 let air flow between the aircraft cabin air 108 and the external ambient air 110 in a controlled manner. The first and second outflow valves 102, 104 and the controllers/drivers therefore (described further below) provide automatic control of the aircraft cabin pressure. The negative pressure relief valve 112 prevents the build up of an excessive negative pressure differential between the cabin and ambient air, and thereby provides an independent and redundant means of negative pressure relief.

The poppet-type pressure relief valve 114 prevents the build up of a positive pressure differential between the cabin and ambient air. The poppet-type pressure relief valve 114 thereby provides an independent and redundant means of positive pressure relief. As will be described in greater detail further below in connection with FIGS. 2-4, the poppet-type pressure relief valve 114 is a pneumatic poppet-type relief valve in a preferred embodiment. The poppet-type pressure relief valve 114 includes a base assembly 204 and a main poppet 206, at least one of which has a fluorocarbon coating that helps to prevent excessive ice formation and sticking for the poppet-type pressure relief valve 114. In addition, the poppet-type pressure relief valve 114 is sized such that it can exhaust the required airflow to limit the positive cabin-to-ambient differential pressure when the first and second outflow valves 102, 104 are closed.

In a preferred embodiment, the first motor 116 and the first backup motor 118 control the opening and closing of the first outflow valve 102. Likewise, the second motor 120 and the second backup motor 122 control the opening and closing of the second outflow valve 104. In a preferred embodiment, the first motor 116 is driven by a first outflow valve motor driver 124, while the first backup motor 118 is driven by a first backup motor driver 126. In a preferred embodiment, both the first outflow valve motor driver 124 and the first backup motor driver 126 are part of a first outflow valve control unit 128.

Similarly, in a preferred embodiment, the second motor 120 is driven by a second outflow valve motor driver 130, and the second backup motor 122 is driven by a second backup motor driver 132. Also in a preferred embodiment, both the second outflow valve motor driver 130 and the second backup motor driver 132 are part of a second outflow valve control unit 134. In the event of a failure of the first outflow valve motor driver 124, the second outflow valve motor driver 130 may take over control of the first outflow valve 102 by means of commands sent through the data bus 135 to the first backup motor driver 126. Likewise, in the event of a failure of the second outflow valve motor driver 130, the first outflow valve motor driver 124 may take over control of the second outflow valve 104 by means of commands sent through the data bus 135 to the second backup motor driver 132.

In addition, if the first motor 116 fails, then the first backup motor 118 and the first backup motor driver 126 are used to control the first outflow valve 102 by commands sent through the data bus 135 from the second outflow valve motor driver 130. Likewise, if the second motor 120 fails, then the second backup motor 122 and the second backup motor driver 132 are used to control the second outflow valve 104 by commands sent through the data bus 135 from the first outflow valve motor driver 124.

In the event of a failure of both the first and second outflow valve motor drivers 124, 130, a semiautomatic controller 138 may control both the first and second outflow valves 102, 104 by means of commands sent through the data bus 136 to the first and second backup motor drivers 126, 132. Semiautomatic controller 138 may also receive commands from a pilot through an input 140 or through an avionics system 142.

The first and second outflow valve motor drivers 124, 130 may interface with the avionics system 142 through first and second avionics data converters 144, 146, which convert avionics full-duplex switched Ethernet (AFDX) (or similar format) data into ARINC 429 (or similar) data. These first and second avionics data converters 144, 146, are advantageously used to simplify the design of the first and second outflow valve motor drivers 124, 130, as these are part of larger systems which may already have this functionality. Or, the first and second outflow valve motor drivers 124 and 130 can receive AFDX (or similar) inputs directly from the avionics system 142, eliminating the functions of the first and second avionics data converters 144, 146.

Figure 2:
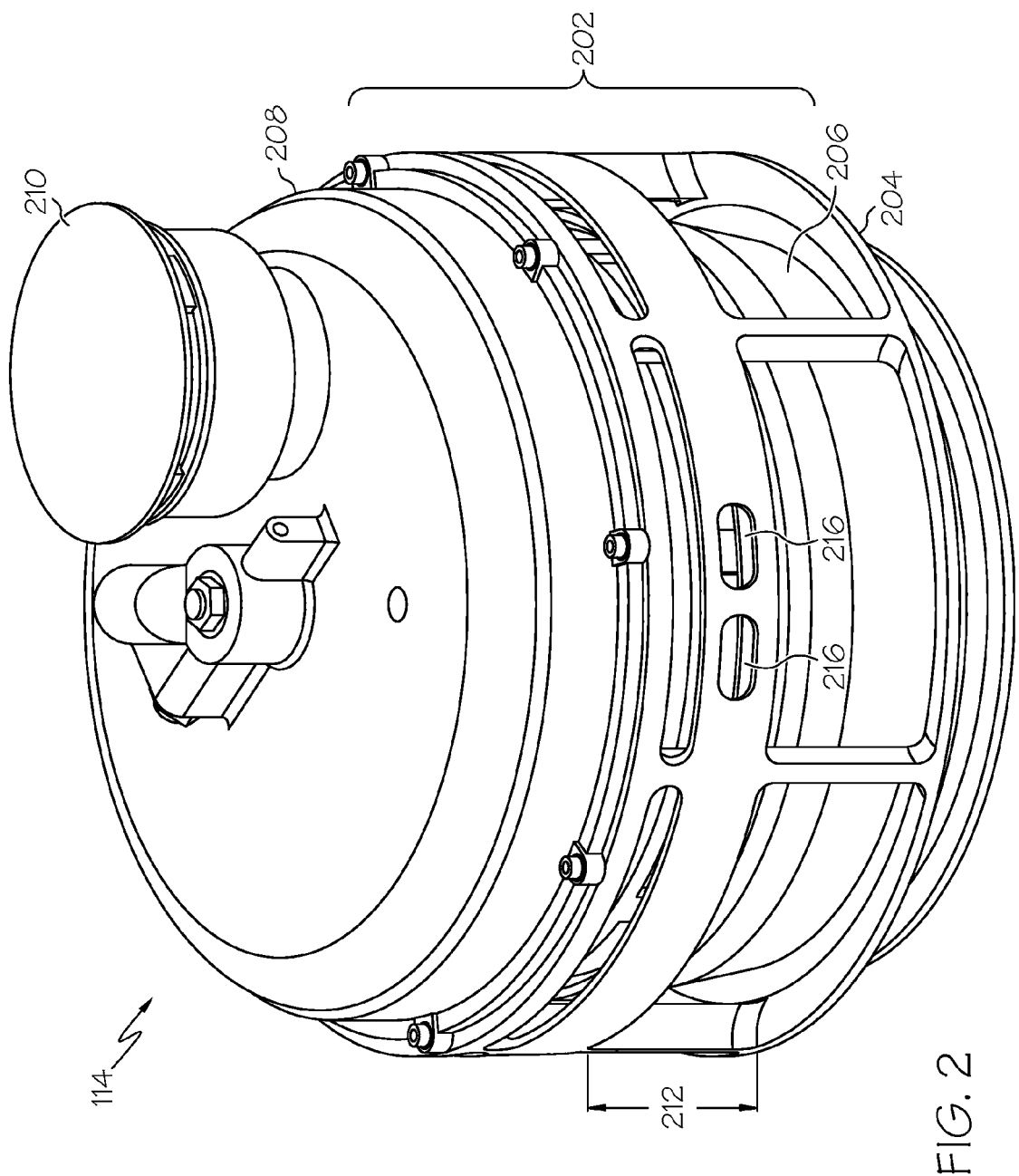
FIG. 2 is a perspective diagram of a poppet-type pressure relief valve that can be utilized in connection with the cabin pressure control system of FIG. 1, in accordance with an exemplary embodiment of the present invention.
Figure 3:
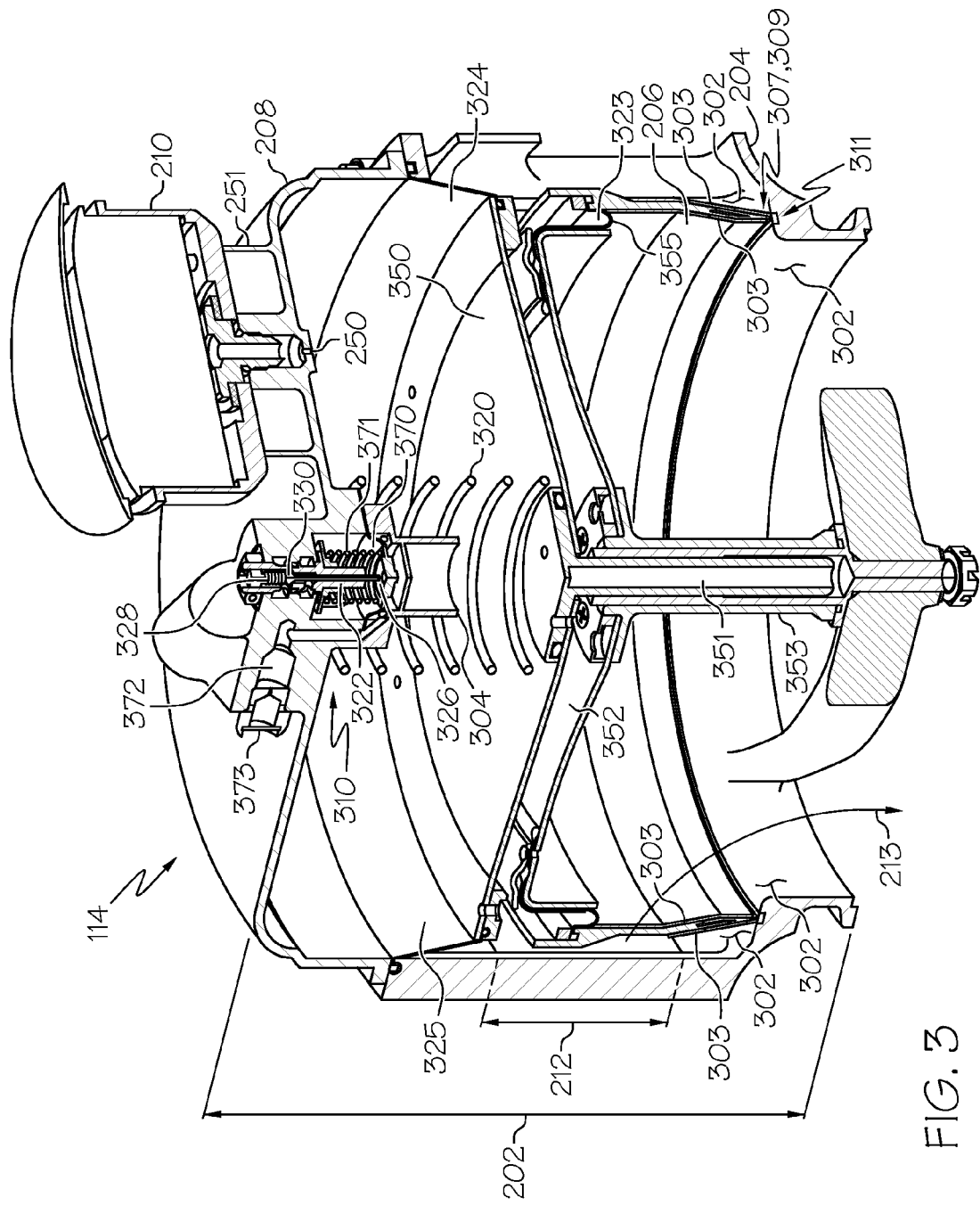
FIG. 3 is a cross sectional diagram of the poppet-type pressure relief valve of FIG. 1, in accordance with an exemplary embodiment of the present invention.
Figure 4:
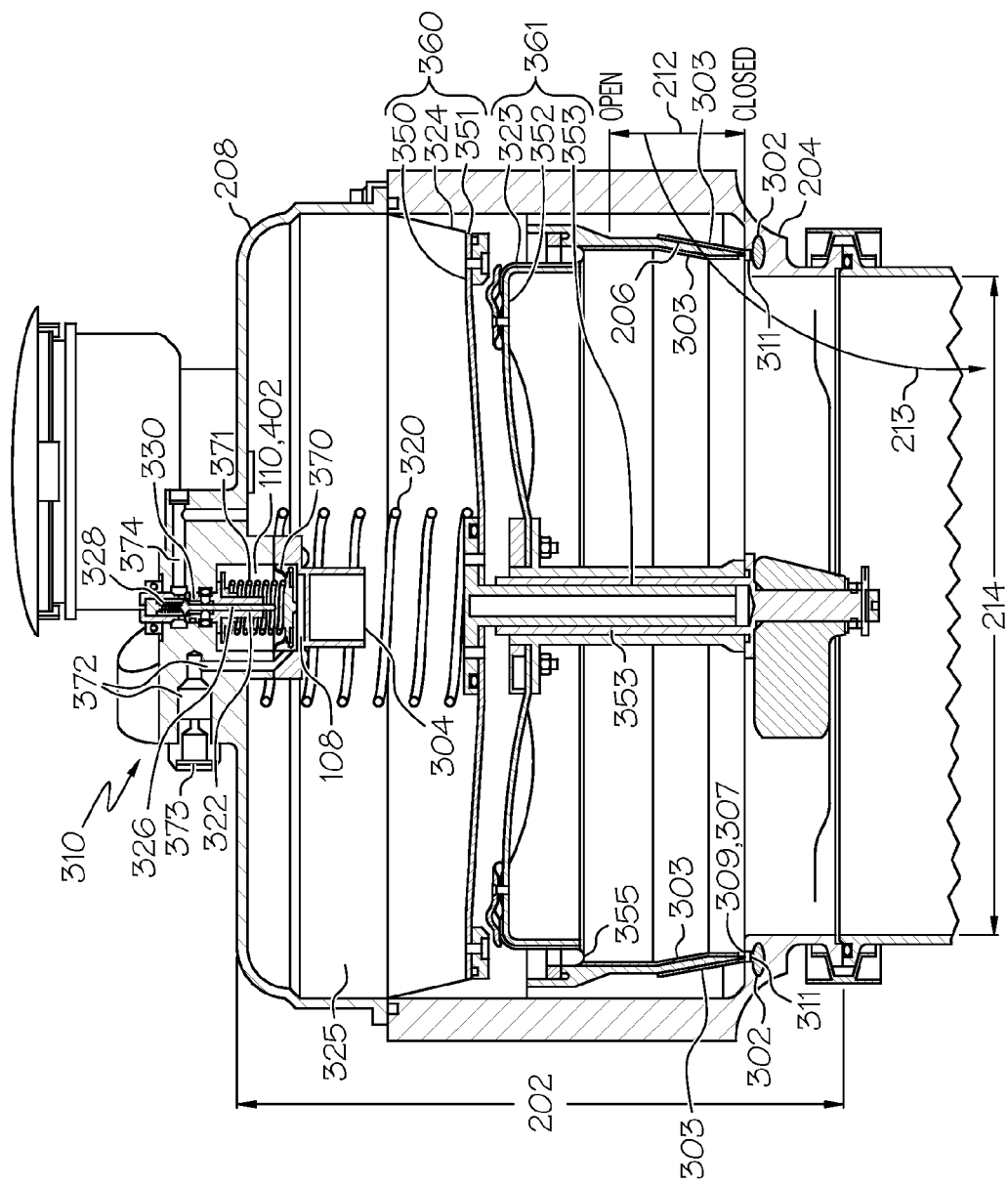
FIG. 4 is a cross sectional diagram of the poppet-type pressure relief valve of FIG. 1 shown with pressurization of certain valve components, in accordance with an exemplary embodiment of the present invention.

FIGS. 2-4 depict a poppet-type pressure relief valve 114 that can be used in the cabin pressure control system 100 of FIG. 1, in accordance with an exemplary embodiment. Specifically, FIG. 2 is a perspective diagram of the poppet-type pressure relief valve 114 of FIG. 1, FIG. 3 is a cross sectional diagram of the poppet-type pressure relief valve 114 of FIG. 1, and FIG. 4 is a cross sectional diagram of the poppet-type pressure relief valve 114 of FIG. 1 shown with pressurization of certain valve components, all in accordance with an exemplary embodiment of the present invention.

The poppet-type pressure relief valve 114 is a balanced poppet valve. As noted above, the poppet-type pressure relief valve 114 prevents the build up of a positive pressure differential between the cabin and ambient air, to thereby provide an independent and redundant means of positive pressure relief. Also as noted above, the outflow relief poppet is a pneumatic poppet-type relief valve in a preferred embodiment, and helps to prevent excessive ice formation and sticking for the poppet-type pressure relief valve 114. In a preferred embodiment, the poppet-type pressure relief valve 114 is mounted on a rear pressure bulkhead of an aircraft. However, this may vary in other embodiments. For example, in one other exemplary embodiment, the poppet-type pressure relief valve 114 is mounted on a skin of the aircraft. In addition, as mentioned above, the poppet-type pressure relief valve 114 is preferably sized such that it can exhaust the required airflow to limit the positive cabin-to-ambient differential pressure when the first and second outflow valves 102, 104 are closed.

As depicted in FIGS. 2-4, the poppet-type pressure relief valve 114 includes a valve body 202, a base assembly 204, a poppet 206, an cover assembly 208, a filter assembly 210, and a plurality of lanyard orifices 216. In addition, as shown in FIGS. 3 and 4, the poppet-type pressure relief valve 114 also preferably includes a retract stop 304 for stopping the poppet 206 in the open direction, an actuator diaphragm 324 and actuator plate 350 and guide shaft 351 assembly 360, a balance diaphragm 323 and baffle plate 352 and poppet guide 353 assembly 361 and a metering section 310.

The valve body 202 includes an inlet 212, an outlet 214, and a fluid flow passage 213 therebetween. The base assembly 204 is formed within the valve body 202. The base assembly 204 includes a poppet seat 311 on which the poppet 206 rests when the poppet 206 is in a closed position. In a preferred embodiment, the base assembly 204 mates to an aircraft stud duct flange, and is retained with a V-band clamp. Also in a preferred embodiment, the base assembly 204 provides a sealing surface for the poppet 206. In addition, in a preferred embodiment, the base assembly 204 includes a structural element to guide the axial movement of various diaphragms (including a first diaphragm 323 referenced herein as a balance diaphragm 323 and a second diaphragm 324 referenced herein as an actuator diaphragm 324), described in greater detail further below) when the poppet-type pressure relief valve 114 is actuated. Also in a preferred embodiment, the base assembly 204 mates to the cover assembly 208 (described below), thereby effectively trapping one end of the actuator diaphragm 324 and actuator plate 350.

In a preferred embodiment, the base assembly 204 has a fluorocarbon coating 302. The fluorocarbon coating 302 helps to prevent excessive ice formation and sticking for the poppet-type pressure relief valve 114. In a preferred embodiment, the fluorocarbon coating 302 is on a portion of an outer surface of the base assembly 204 proximate, and preferably substantially adjacent to, a circumferential knife edge 307 of the poppet 206. In one preferred embodiment, the fluorocarbon coating 302 is on a portion of an outer surface of the base assembly 204 immediately adjacent to the circumferential knife edge 307 of the poppet 206. Also in a preferred embodiment, the poppet seat 311 of the base assembly 204 does not have a fluorocarbon coating 302. In addition, in a preferred embodiment, the fluorocarbon comprises a fluorocarbon dispersion substance, most preferably a PTFE substance.

The poppet 206 is disposed in the valve body 202, and is movable between at least a closed position and an open position. When the poppet 206 is in the closed position, the poppet 206 at least substantially restricts fluid from flowing through the fluid flow passage 213, for example by seating against the base assembly 204. In a preferred embodiment, the poppet 206 seats against the poppet seat 311 of the base assembly 204 when the poppet 206 is in the closed position, as is depicted in FIG. 2. Conversely, when the poppet 206 is in one or more open positions, the poppet is a distance away from the poppet seat 311 base assembly 204, and fluid is allowed to flow through the fluid flow passage 213. The poppet 206 raises up and down with respect to the poppet seat 311 of the base assembly 204 as air is flowing within the poppet-type pressure relief valve 114. In addition, in a preferred embodiment, the poppet 206 is spring-loaded with a spring 320 to help assure closure of the poppet-type pressure relief valve 114.

In the depicted embodiment, the poppet 206 is a cylindrical poppet. Also in the depicted embodiment, the poppet 206 is a knife edge poppet with a circumferential knife edge 307 (in a preferred embodiment, a circular knife edge about the bottom of the poppet 206), for example as depicted in FIG. 3. In addition, in the depicted embodiment, the poppet 206 is a primary or main poppet for the poppet-type pressure relief valve 114. Also in the depicted embodiment, the poppet 206 includes a sealing edge 309 with respect to the base assembly 204 as shown in FIG. 3.

In a preferred embodiment, the poppet 206 also has a fluorocarbon coating 303, such as the fluorocarbon coating 303 depicted on the poppet 206 in FIG. 3. The fluorocarbon coating 303 helps to prevent excessive ice formation and sticking for the poppet-type pressure relief valve 114. In a preferred embodiment, the fluorocarbon coating 303 is on a portion of an outer surface of the poppet 206 proximate the base assembly 204. In one preferred embodiment, the fluorocarbon coating 303 is on an outer surface of the circumferential knife edge 307 of the poppet 206. In addition, in a preferred embodiment, the sealing edge 309 of the poppet 206 does not have a fluorocarbon coating 303. In certain embodiments, the fluorocarbon coating 303 also extends along a portion of an outer surface of the poppet 206 along the circumferential knife edge 307, and preferably also proximate to the base assembly 204. In addition, in a preferred embodiment, the fluorocarbon comprises a fluorocarbon dispersion substance, most preferably a PTFE substance. In embodiments in which the base assembly 204 and the poppet 206 each have respective fluorocarbon coatings 302, 303, preferable the respective fluorocarbon coatings 302, 303 comprise the same type of fluorocarbon substance, most preferably a PTFE substance.

The location of the one or more fluorocarbon coating(s) 302, 303 may vary in different embodiments. For example, in some embodiments, such as that depicted in FIG. 3, there are separate fluorocarbon coatings 302, 303 on the base assembly 204 and on the poppet 206, respectively. In certain other embodiments, one or more fluorocarbon coatings 302 may be on the base assembly 204 and not on the poppet 206. In yet other embodiments, one or more fluorocarbon coatings 303 may be on the poppet 206 and not the base assembly 204. Also, in certain embodiments, the fluorocarbon coating 302 on the base assembly 204, if any, may be of a different size or cover a different region of the base assembly 204 than that depicted in FIG. 3. Similarly, in certain embodiments, the fluorocarbon coating 303 on the poppet 206, if any, may be of a different size or cover a different region of the poppet 206 than that depicted in FIG. 3.

The cover assembly 208 mates to the base assembly 204, thereby trapping one end of the actuator diaphragm 324 and actuator plate 350 and guide shaft 351 assembly 360 (as referenced above). Also in a preferred embodiment, the cover assembly 208 provides housing for the metering section 310. In addition, in a preferred embodiment, the cover assembly 208 contains the valve actuation pressure during operation of the poppet-type pressure relief valve 114. Also in a preferred embodiment, the cover assembly 208 includes the above-referenced lanyard orifices 216. In addition, in a preferred embodiment, the cover assembly 208 includes a bleed orifice 250 and structure 251 for the filter assembly 210. The filter assembly 210 filters air as it enters through the bleed orifice 250.

As mentioned above, in the depicted embodiment, the poppet-type pressure relief valve 114 also includes an actuator diaphragm 324 and actuator plate 350 and guide shaft 351 assembly 360 and a metering section 310. The actuator diaphragm 324 and actuator plate 350 and guide shaft 351 assembly 360 is housed within the valve body 202, and preferably within the cover assembly. The balance diaphragm 323 and baffle plate 352 and poppet guide 353 assembly 361 is housed within the valve body 202, and preferably within the base assembly 204 perimeter. In a preferred embodiment, the balance diaphragm 323 facilitates relief of negative overpressure, as discussed in greater detail further below. The balance diaphragm 323 contains a convolute 355 geometry. The center of the balance diaphragm 323 convolute 355 preferably lines up vertically with the circumferential knife edge 307 of the main poppet 206 of the poppet-type pressure relief valve 114. Also in a preferred embodiment, the actuator diaphragm 324 is an actuating diaphragm, and facilitates relief of positive overpressure, as discussed in greater detail further below.

The metering section 310 includes a metering valve 322 that controls a differential pressure of the poppet-type pressure relief valve 114. The metering section is housed within the valve body 202. In a preferred embodiment, the metering valve 322 contains a metering valve poppet 326 that is movable within the metering valve 322 housing and is spring loaded to the normally closed position against the metering valve seat 330 using the metering valve compression spring 328. In a preferred embodiment, the metering section 310 is housed within the cover assembly 208. In a preferred embodiment, the metering valve 322 provides an airflow path between the actuator chamber 325 of the poppet-type pressure relief valve 114 and atmospheric pressure 110 when actuated by the actuator diaphragm 324. The actuator chamber 325 is depicted in FIG. 3, and is also depicted in FIG. 4 with reference to an unpressurized side 402 (110 in FIG. 1) coupled thereto.

The metering section 310 includes a third diaphragm 370 (referenced herein as a metering diaphragm 370) that is modulated in position by the difference in pressure between the atmospheric pressure (Pa) 110, 402 and the cabin pressure (Pc) 108. Atmosphere pressure (Pa) 110 (FIG. 1) 402 (FIG. 4) is connectively coupled to the top side of the metering diaphragm 370 using a tubing (not shown) from the atmospheric pressure (110) to the cover assembly 208 and then within internal ducts (not shown) of the cover assembly 208 to the top side of the metering diaphragm 370. Cabin pressure (Pc) 108 is connectively coupled to the bottom side of the metering diaphragm 370 via the cover assembly 208 internal ducting 372 and air filter screen 373.

The metering section 310 includes a compression metering spring 371 that is compressed between the cover assembly 208 and the metering diaphragm 370. The amount of compression of the metering spring 371 is dependent on the difference in pressure between the atmospheric pressure (Pa) 110, 402 and the cabin pressure (Pc) 108 applied across the metering diaphragm 370.

When the difference between atmosphere pressure (Pa) 110 and the cabin pressure (Pc) 108 is great enough, the metering diaphragm 370 compresses the metering spring 371 enough so that the metering diaphragm 370 actuates a metering valve poppet 326 in the metering valve 322 away from the closed position. This difference between atmosphere pressure (Pa) 110 and the cabin pressure (Pc) 108 that causes the metering valve poppet 326 to actuate away from the closed position is the calibrated differential pressure of the poppet-type pressure relief valve 114. Upon the metering valve poppet 326 actuating away from the closed position on the metering valve seat 330, an air passage way 374 is opened between the actuator chamber 325 and atmosphere pressure (Pa) 110, 402. When the difference between the atmosphere pressure (Pa) 100 and the cabin pressure (Pc) 108 is reduced below the calibrated differential pressure, the metering diaphragm 370 reduces the compressive force on the metering spring 371, and the metering diaphragm 370 no longer pushes up against the metering valve poppet 326, allowing the metering valve compression spring 328 to push the metering valve poppet 326 to the closed position on the metering valve seat 330 within the metering valve 322, thus removing the connective coupling between the valve actuator chamber 325 and the atmosphere pressure (Pa) 110, 402.

When the metering valve poppet 326 is lifted off its seat 330, an airflow path between the actuator chamber 325 is opened to atmospheric pressure. The local pressure in the actuator chamber 325 is reduced, to thereby result in a net upward force on the actuator diaphragm 324 and actuator plate 350 of the poppet-type pressure relief valve 114. This causes the main poppet 206 of the poppet-type pressure relief valve 114 to rise off of the base assembly 204 and the poppet seat 311 thereof, and cabin air is thereby allowed to exit the fuselage. This in turn causes the pressure in the cabin to decline.

The poppet-type pressure relief valve 114 can be calibrated by adjusting the amount of compression on the metering section 310 spring load for the metering spring 371. This can be accomplished by adjusting a retainer of the metering spring 371 such that the differential pressure across the metering diaphragm 370 begins to actuate the metering valve poppet 326 at the correct differential pressure.

In a preferred embodiment, the closed-loop regulation of the cabin-to-atmospheric differential pressure begins with the sensing of the differential pressure by the above-referenced metering diaphragm 370 of the metering section 310. As the differential pressure rises and lowers relative to a calibrated set point, the metering valve poppet 326 is actuated. As the metering valve poppet 326 is raised and lowered, airflow is modulated from the actuator chamber 325 to the atmospheric pressure, thereby changing the local pressure in the actuator chamber 325. The changes in pressure of the actuator chamber 325 cause the main poppet 206 of the poppet-type pressure relief valve 114 to raise and lower from the base assembly 204, thereby modulating airflow from the pressurized fuselage (i.e., cabin pressure) to atmospheric pressure.

In a preferred embodiment, the poppet-type pressure relief valve 114 provides relief of positive overpressure and negative overpressure. The poppet-type pressure relief valve 114 provides relief of positive overpressure via the metering section 310. Specifically, when the cabin pressure exceeds the valve set point, the metering valve 322 opens to limit cabin pressure in the actuator chamber 325. Initially, the pressure in the actuator chamber 325 (Pact) is equal to the cabin pressure (Pc). When the metering valve 322 opens, the pressure in the actuator chamber 325 is relieved, and air enters the actuator chamber 325 through an in-bleed orifice 250. Due to the in-bleed orifice, the pressure in the actuator chamber 325 is less than the cabin pressure. For this reason, the cabin pressure acting on one side of the actuator diaphragm 324 and actuator plate 350 will move the actuator diaphragm 324 and actuator plate 350 and compress the actuator compression spring 320. The actuator diaphragm 324 is preferably connected to the main poppet 206 of the poppet-type pressure relief valve 114. Accordingly, the main poppet 206 of the poppet-type pressure relief valve 114 moves off of its poppet seat 311. With the main poppet 206 of the poppet-type pressure relief valve 114 off of its poppet seat 311, the relatively high cabin pressure is relieved to the lower ambient pressure until the cabin pressure reaches a pressure low enough that the metering section 310 closes the metering valve poppet 326.

The poppet-type pressure relief valve 114 provides relief of negative overpressure when the cabin pressure is less than the atmospheric conditions. When the cabin pressure 108 is less than the atmospheric pressure 110, the pressure balance on the balance diaphragm 323 and baffle plate 352 will be such that the atmosphere pressure will create a force against the baffle plate 352 and balance diaphragm 323 that overcomes the actuator compression spring 320 force to move the baffle plate 352 and actuator plate 350 to compress the actuator compression spring 320. When the baffle plate 352 and actuator plate 350 moves upward, the main poppet 206 of the poppet-type pressure relief valve 114 will lift off of the poppet seat 311. When the main poppet 206 of the poppet-type pressure relief valve 114 moves off of the poppet seat 311, air will ingress from outlet 214 to inlet 212 via fluid flow passage 213 (reverse of positive differential pressure flow direction) into the cabin 110 to help reduce the cabin-to-atmosphere differential pressure.

As discussed, above, the poppet-type pressure relief valve 114 has one or more fluorocarbon coatings 302, 303 on the base assembly 204 of the poppet-type pressure relief valve 114, the main poppet 206 of the poppet-type pressure relief valve 114, or both. The one or more fluorocarbon coatings 302, 303 help to prevent or reduce unwanted ice build-up in the poppet-type pressure relief valve 114 and unwanted sticking in the poppet-type pressure relief valve 114.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A valve for use in a cabin pressure control system for an aircraft, the valve comprising:
 a valve body including an inlet, an outlet, and a fluid flow passage therebetween; and a poppet disposed in the valve body and moveable between at least a closed position, in which the poppet at least substantially restricts fluid from flowing through the fluid flow passage, and an open position, in which fluid is allowed to flow through the fluid flow passage, wherein the valve body, the poppet, or both, have a fluorocarbon coating.

2. The valve of claim 1, wherein:
the poppet has a knife edge having an outer surface; and
the fluorocarbon coating covers at least a portion of the outer surface of the knife edge.

3. The valve of claim 1, wherein the valve body comprises a base assembly on which the poppet is mounted, the base assembly having the fluorocarbon coating.

4. The valve of claim 3, wherein:
the poppet has a knife edge; and
the fluorocarbon coating covers a portion of the base assembly substantially adjacent to the knife edge.

5. The valve of claim 1, wherein:
the valve body comprises a base assembly on which the poppet is mounted;
the poppet has a first fluorocarbon coating; and
the base assembly has a second fluorocarbon coating.

6. The valve of claim 1, wherein the poppet has an outer surface and a sealing edge, and the fluorocarbon coating is on a portion of the outer surface but not on the sealing edge.

7. A valve for use in a cabin pressure control system for an aircraft, the valve comprising:
a valve body including a base assembly, an inlet, an outlet, and a fluid flow passage between the inlet and the outlet; and
a poppet mounted on the base assembly and moveable between at least a closed position, in which the poppet at least substantially restricts fluid from flowing through the fluid flow passage, and an open position, in which fluid is allowed to flow through the fluid flow passage, the poppet having a circumferential knife edge;
wherein the poppet, the base assembly, or both, have a fluorocarbon coating proximate the circumferential knife edge.

8. The valve of claim 7, wherein the poppet has an outer surface, and the fluorocarbon coating covers a portion of the outer surface.

9. The valve of claim 7, wherein the base assembly has the fluorocarbon coating substantially adjacent to the circumferential knife edge.

10. The valve of claim 7, wherein:
the poppet has a first fluorocarbon coating covering at least a portion of an outer surface of the circumferential knife edge; and
the base assembly has a second fluorocarbon coating substantially adjacent to the circumferential knife edge.

11. A system for controlling cabin pressure in an aircraft, the system comprising:
a first outflow valve configured to exhaust airflow from a cabin of the aircraft when the first outflow valve is open or when the first outflow valve is closed;
a second outflow valve configured to exhaust airflow from the cabin when the second outflow valve is open or when the first outflow valve is closed; and
a poppet-type pressure relief valve configured to exhaust airflow from the cabin when the first outflow valve and the second outflow valve are fully or partially closed, to thereby limit a cabin-to-ambient differential pressure and control the cabin pressure, the poppet-type pressure relief valve comprising:
a valve body including a base assembly, an inlet, an outlet, and a fluid flow passage between the inlet and the outlet; and
a poppet mounted on the base assembly and moveable between at least a closed position, in which the poppet at least substantially restricts fluid from flowing through the fluid flow passage, and an open position, in which fluid is allowed to flow through the fluid flow passage, the poppet having a circumferential knife edge;
wherein the poppet, the base assembly, or both, have a fluorocarbon coating proximate the circumferential knife edge.

12. The system of claim 11, wherein the poppet has the fluorocarbon coating, and the fluorocarbon coating covers at least a portion of an outer surface of the circumferential knife edge.

13. The system of claim 11, wherein the base assembly has the fluorocarbon coating substantially adjacent to the circumferential knife edge.

14. The system of claim 11, wherein:
the poppet has a first fluorocarbon coating covering at least a portion of the circumferential knife edge; and
the base assembly has a second fluorocarbon coating substantially adjacent to the circumferential knife edge.

15. The valve of claim 1, wherein the valve body, the poppet, or both, have a fluorocarbon coating proximate a location in which the poppet contacts the valve body.

16. The valve of claim 7, wherein the valve body, the poppet, or both, have a fluorocarbon coating proximate a location in which the poppet contacts the valve body.

17. The system of claim 11, wherein the valve body, the poppet, or both, have a fluorocarbon coating proximate a location in which the poppet contacts the valve body.

18. The valve of claim 3, wherein:
the base assembly includes a seat on which the poppet rests when in a closed position; and
the base assembly includes the fluorocarbon coating proximate the seat but not on the seat itself.

19. The valve of claim 7, wherein:
the base assembly includes a seat on which the poppet rests when in a closed position; and
the base assembly includes the fluorocarbon coating proximate the seat but not on the seat itself.

20. The system of claim 11, wherein:
the base assembly includes a seat on which the poppet rests when in a closed position; and
the base assembly includes the fluorocarbon coating proximate the seat but not on the seat itself.

* * * * *